United States Patent [19]
Timko

[11] Patent Number: 5,701,504
[45] Date of Patent: Dec. 23, 1997

[54] APPARATUS AND METHOD FOR ADDITION BASED ON KOGGE-STONE PARALLEL ALGORITHM

[75] Inventor: Mark A. Timko, Portland, Oreg.

[73] Assignee: Intel Corporation, Santa Clara, Calif.

[21] Appl. No.: 365,204

[22] Filed: Dec. 28, 1994

[51] Int. Cl.⁶ ................................................ G06F 15/00
[52] U.S. Cl. .................. 395/800; 364/787; 364/786
[58] Field of Search .................... 364/787, 786; 395/800

[56] References Cited

U.S. PATENT DOCUMENTS

| | | | |
|---|---|---|---|
| 4,737,926 | 4/1988 | Vo et al. | 364/787 |
| 4,905,180 | 2/1990 | Kumar | 364/787 |
| 5,047,975 | 9/1991 | Patti et al. | 364/786 |
| 5,327,369 | 7/1994 | Ashkewazi | 364/787 |

OTHER PUBLICATIONS

"The Metaflow Architecture" by Val Popoescu, et al. *IEEE Micro* (Jun. 1991) pp. 10–13, 63–73.

*Primary Examiner*—Alyssa H. Bowler
*Assistant Examiner*—John Follansbee
*Attorney, Agent, or Firm*—Blakely, Sokoloff, Taylor & Zafman

[57] ABSTRACT

An adder which reduces signal propagation delay experienced by conventional adders by calculating bitwise carries and utilizing these bitwise carries as non-selecting inputs. In a preferred embodiment, the adder includes three primary circuits. The first circuit for generating propagate and generate signals based on its two inputs. The second circuit uses the propagate and generate signals in combination with a global carry-in signal to produce bitwise carries based on the Kogge-Stone Parallel Algorithm. These bitwise carries in combination with bit sums of the first and second digital inputs are used to calculate a plurality of real bit sums corresponding to the sum of these digital inputs.

29 Claims, 7 Drawing Sheets

FIG. 6A
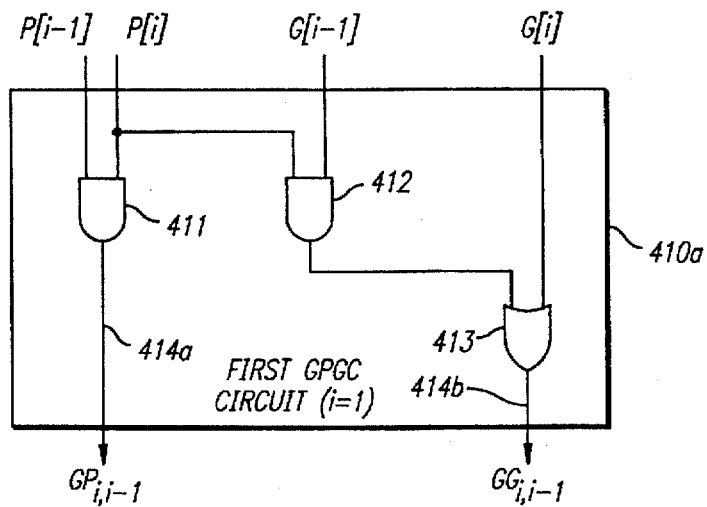
FIG. 6B
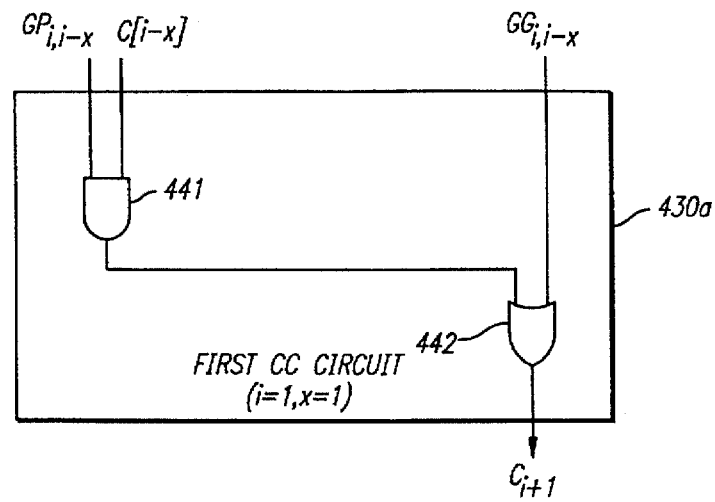
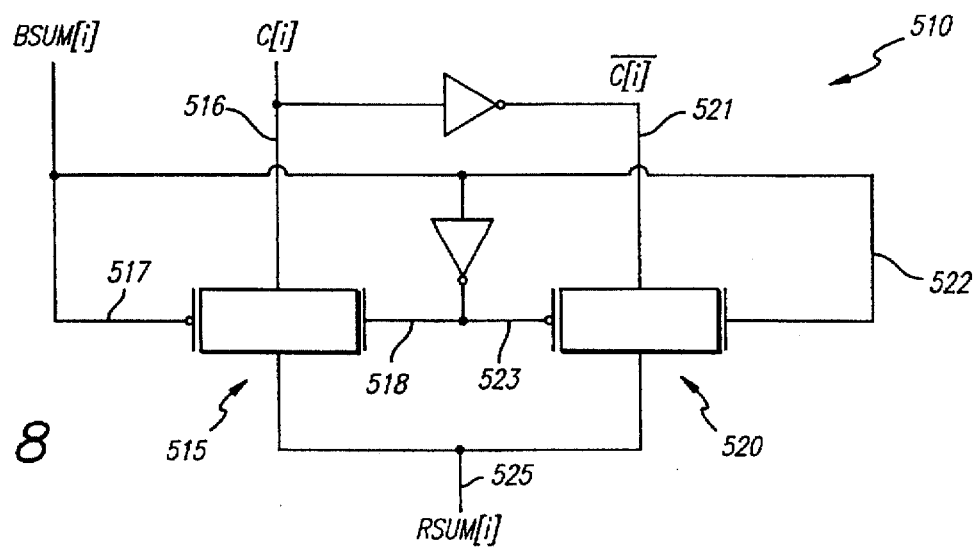
FIG. 8

APPARATUS AND METHOD FOR ADDITION BASED ON KOGGE-STONE PARALLEL ALGORITHM

BACKGROUND OF THE INVENTION

1. Field of the Invention

The present invention relates to the field of digital computation circuits. More particularly, the present invention relates to a carry-propagate adder based on the Kogge-Stone Parallel Algorithm.

2. Background Art Related to the Invention

Fundamental to the operations of any computer or microprocessor is the processor itself. The processor performs a number of operations including arithmetical or logical ("bitwise") operations on various inputs to the processor. One necessary arithmetic operation inherent in most processors is adding two digital numbers (i.e., operands) together. Due to increased public demand for faster processors and related components, carry-propagate adders ("CPAs") are widely being used. The reason for such wide use is that they usually perform parallel operations and conditional sum calculations which enhance processing speed.

Referring to FIG. 1, a conventional CPA 100 receives as input two operands "$A_n$" and "$B_n$". For clarity sake, the conventional CPA 100 is illustrated as a 32-bit adder where $A_n$ and $B_n$ have bit representations of A[31], A[30], ..., A[0] (or collectively referenced as "A[31:0]") and B[31:0]. Both of these operands A[31:0] and B[31:0] are input into a propagate/generate and bit sum generation ("PGBSG") circuit 110 which performs two operations. First, the PGBSG circuit 110 produces appropriate propagate "P[31:0]" signals and generate "G[31:0]" signals. A propagate "P[i]" signal is a logical OR'ing of correspondingly ordered bits of the operand (i.e., A[i]+B[i], where "+" is a logical OR operator) while a generate signal is a logical AND'ing of these bits (i.e., A[i]* B[i], where "*" is a logical AND operator).

Secondly, the PGBSG circuit 110 calculates and produces bitwise bit sums ("BSUM[31:0]") for operands A[31:0] and B[31:0]. A bit sum is defined as a logical XOR between identically ordered bits, for example, the bit sum of the $i^{th}$ bit ("BSUM[i]") of the operands $A_n$ and $B_n$ is equal to A[i] XOR B[i]. After performing the above-identified functions, the PGBSG circuit 110 outputs P[31:0] and G[31:0] signals into a first group propagate/group generate ("GP/GG") circuit 120, BSUM[31:4] into a conditional bit sum logic element 150 and BSUM[3:0] into a lower-order real sum circuit 170. This allocation of information enables three operations to be performed concurrently, enhancing the operational speed of the conventional CPA 100.

A lower-order carry generation logic element 160 receives as input a global carry-in "$C_{in}$" bit, P[3:0] and G[3:0] signals and calculates carry bits C[3:0] and a carry-out designated as "C[4]" based these inputs. The BSUM[3:0] are input into a lower-order bit real sum circuit 170 being four dual-input multiplexers identical to those shown in FIG. 2. Each multiplexer receives as input a corresponding BSUM[i] and its complement $\overline{BSUM[i]}$. The carry bits C[3:0] operate as selecting signals of the dual-input multiplexers to allow real sum bits S[3:0] to be produced, where S[i]=BSUM[i] XOR C[i].

In addition, operating concurrently with the lower-order generation logic element 160, the first GP/GG circuit 120 receives as input P[31:0] and G[31:0] signals from the PGBSG circuit 110. In this embodiment, the first GP/GG circuit 120 is divided into a number of group stage circuits 121–128, where each group stage circuit 121–128 receives as input four distinct sets of propagate and generate signals. Each group stage circuit 121–128 performs logical operations on its corresponding propagate and generate signals to produce group propagate "$GP_{x,y}$" signals and group generate "$GG_{x,y}$" signals being defined according to the algorithm of Table A below.

Table A: Calculation of Group Propagate and Group Generate signals (i) $GP_{x,y} = P[x]*P[x-1]*P[x-2]* \ldots *P[y]$;

(ii) $GG_{x,y} = (G[x]) + (P[x]*G[x-1]) + (P[x]*P[x-1]*G[x-2]) + \ldots + (P[x]*P[x-1]* \ldots * P[Y+1]*G[y])$ (iii) $GP_{y,y} = P[y]$; and (iv) $GG_{y,y} = G[y]$.

All of the group propagate and generate signals $GP_{31,28}$; $GG_{31,28}$; $GP_{30,28}$; ... $GP_{4,4}$, $GG_{4,4}$ from the second and succeeding group stage circuits 122–128 are input into the conditional bit sum logic element 150 as well as $GP_{3,0}$ and $GG_{3,0}$ signals from the first group stage circuit 121. These group propagate and generate signals produce conditional bit sums (discussed below). Meanwhile, only those "most significant" group propagate and group generate signals of each 4-bit group stage circuits 121–128 are input into additional GP/GG circuits 130. These "most significant" signals include $GP_{31,28}$ and $GG_{31,28}$; $GP_{27,24}$ and $GG_{27,24}$; $GP_{23,20}$ and $GG_{23,20}$; $GP_{19,16}$ and $GG_{19,16}$; $GP_{15,12}$ and $GG_{15,12}$; $GP11,8$ and $GG_{11,8}$; $GP_{7,4}$ and $GG_{7,4}$.

Similar to those logical operations for the first GP/GG circuit 120, the additional GP/GG circuits 130 (e.g., a second, third and fourth GP/GG circuits 135–145) appropriately create larger groups than provided by the first GP/GG circuit 120 in order to produce group propagate and generate signals $GP_{27,4}$; $GG_{27,4}$; $GP_{23,4}$; $GG_{23,4}$; $GP_{19,4}$; $GG_{19,4}$; $GP_{15,4}$; $GG_{15,4}$; $GP_{11,4}$; $GG_{11,4}$; $GP_{7,4}$ and $GG_{7,4}$ signals. These group propagate and group generate signals in combination with the C[4] signal (i.e., the carry-in to the fourth bit) are input into a carry generation circuit 180 which generates group carries GC[28], GC[24], GC[20], GC[16], GC[12], GC[8] which are carries of the group stage circuits 121–128 of the first GP/GG circuit 120.

Operating in parallel with the operations performed by the lower-order generation logic element 160 and the other GP/GG circuits, the conditional bit sum logic element 150 computes each bit sum BSUM[31]–BSUM[4] twice. More specifically, one sum "$BSUM_0[i]$" ("i"=4 ... 28) is based on the assumption that the group carry "GC[i]" is equal to logic "0". The other sum "$BSUM_1[i]$" ("i"=4 ... 28) is based on the assumption that GC[i] is equal to logic "1". Both $BSUM_0[i]$ and $BSUM_1[i]$ may be calculated according to the following algorithm.

$BSUM_0[i] = NOT [GG_{i-1} \; XOR \; BSUM[i]]$; and $BSUM_1[i] = NOT [(GG_{i-1} + GP_{i-1}) \; XOR \; BSUM[i]]$.

In this case, since the conditional sums are generated in 4-bit groups, $GG_{i-1}$ and $GG_{i-1}$ signals will be groups of 4, 3, 2 or 1 depending on where "i" is in each group stage. For example, the conditional sums for bits 8 and 10 are respectively equal to the following:

$BSUM_0[8] = NOT [GG_{7,4} \; XOR \; BSUM[8]]$; and $BSUM_1[8] = NOT [(GG_{7,4} + GP_{7,4}) \; XOR \; BSUM[8]]$.

$BSUM_0[10] = NOT [GG_{9,8} \; XOR \; BSUM[10]]$; and $BSUM_1[10] = NOT [(GG_{9,8} + GP_{9,8}) \; XOR \; BSUM[10]]$.

These bit sums are appropriately input into an upper-order real sum circuit 190.

The upper-order real sum circuit 190 includes a plurality of 2:1 multiplexers corresponding in number to the real bit sums ("S[i]") of the CPA 100, excluding the four lowest order real sum bits S[3:0]. As shown in FIG. 2, the conditional bit sums $BSUM_0[k]$ and $BSUM_1[k]$ are input into a $K^{th}$ multiplexer 191$k$, namely drains 194$k$ and 195$k$ of pass gates 192$k$ and 193$k$ forming the $K^{th}$ multiplexer 191$k$. Furthermore, each pass gate 192$k$ and 193$k$ includes gates 196$k$, 198$k$ and 197$k$, 199$k$ which receives a group carry "GC[k]" or $\overline{GC[k]}$ to selectively control which of the conditional sums is transmitted onto an output line as well as other preceding and/or succeeding multiplexers selected by the GC[k] signal. For example, the GC[8] signal selectively controlling those multiplexers determining S[11:8]. Although the conventional CPA 100 supports faster operations a conventional ripple-carry adder, it offers many disadvantages.

One primary disadvantage is that the operational speed of the conventional CPA is limited by the activation of the pass gates of the multiplexers forming the upper-order real sum circuit. The critical path (i.e., longest delay path) in the conventional CPA follows the generation of C[28] which selectively activates the pass gates for those multiplexers associated with S[31:28]. The delay from activating the pass gates in the multiplexer to receiving an appropriate logic value on the S[i] output is typically three times longer than the delay from activating $BSUM_1$ or $BSUM_0$ to outputting that value as S[i] when the pass gates are already selected. Furthermore, the delay from GC[28] to S[31:28] accounts for at least 10% of the total delay of the conventional CPA. Hence, it would be desirable to decrease this delay by alternatively using the drain of the pass gates of the multiplexers for the critical path which clearly is not possible using the conventional CPA.

Another disadvantage is that the carry bits input into the sum logic element are used for selecting multiple multiplexers. As a result, the loading on the carry is significantly high. This requires larger gates to drive the carry resulting in a slower operating circuit that requires more silicon area to implement.

Further disadvantage is that conventional CPAs are not easy to implement in silicon since they cannot be divided up into individual bitwise logic (bit slicing). To "bit slice" a conventional CPA, you need to identify all the logic that is directly associated with the particular bit and group that logic together. As shown in FIG. 1, all the circuits can be separated up into individual bit operations except for the additional GP/GG circuits. These grouping circuits are not associated with any particular bit slice since they use the most significant group propagate and generate signals from each group stage circuit of the first GG/GP circuit. Rather, this logic must either be distributed across four bit slices or be all grouped together as a stub on the side of all the other logic. Neither choice is desirable from an implementation standpoint.

Yet another disadvantage associated with the inability to bit slice the conventional CPA is that such inability precludes the conventional CPA from easy modification of its bit width (i.e., from 8 to 16 to 32 to 64 bits) by simply adding more bit slices.

Hence, it would be desirable to provide a carry-propagate adder based on the Kogge-Stone Parallel Algorithm which operates faster and is conducive to bit slicing and method for performing those requisite operational steps of the carry-propagate adder.

BRIEF SUMMARY OF THE INVENTION

The present invention is an integrated circuit device being an adder receiving a first digital input and a second digital input. The adder comprises a PGBSG circuit, a carry generation circuit and a read sum generation circuit. The PGBSG circuit performs logical operations on a first and second digital inputs to produce a plurality of bitwise propagate and generate signals. Furthermore, the PGBSG circuit may generate a plurality of bit sums which are input directly into the real sum generation circuit.

The carry generation circuit is coupled to the PGBSG circuit to receive the plurality of bitwise propagate and generate signals. Upon receipt of these signals and a global carry in signal, the carry generation circuit performs appropriate logical operations according to Kogge-Stone Parallel Algorithm on these signals to produce a plurality of bitwise carry signals. Thereafter, the bitwise carry signals are transferred to the real sum generation circuit. The real sum generation circuit receives the carry signals and the bit sums and produces a plurality of real bit sums being the additive value of the first and second digital inputs.

BRIEF DESCRIPTION OF THE DRAWINGS

The features and advantages of the present invention will become apparent from the following detailed description of the present invention in which:

FIG. 6A is an illustrative circuit diagram of an embodiment of a group propagate/generate calculation circuit employed within the carry generation circuit of FIG. 5.

FIG. 6B is an illustrative circuit diagram of an embodiment of a carry calculation circuit employed within the carry generation circuit of FIG. 5.

FIG. 8 is a dual-input multiplexer employed within the real sum generation circuit of FIG. 4.

DETAILED DESCRIPTION OF THE PRESENT INVENTION

A carry-propagate adder ("CPA") and method for increasing operational speed of the CPA is described below. In the following description, for purposes of explanation, specific details are set forth in order to provide a thorough understanding of the present invention. However, it will be apparent to one skilled in the art of circuit design that the present invention may be practiced in any semiconductor device, especially processors, without these specific details. In other instances, well known operations, functions and devices are not shown in order to avoid obscuring the present invention.

Some portions of the detailed description which follow are presented in terms of algorithms and symbolic representations of logical operations which are the means used by those skilled in the art to most effectively convey the substance of their work to others skilled in the art. Herein, an algorithm is generally conceived to be a self-consistent sequence of steps leading to a desired result. The steps are those requiring physical manipulation of physical qualities, usually taking the form of electrical or magnetic signals (or bits) capable of being stored, transferred, combined, compared or otherwise manipulated.

Figure 3:
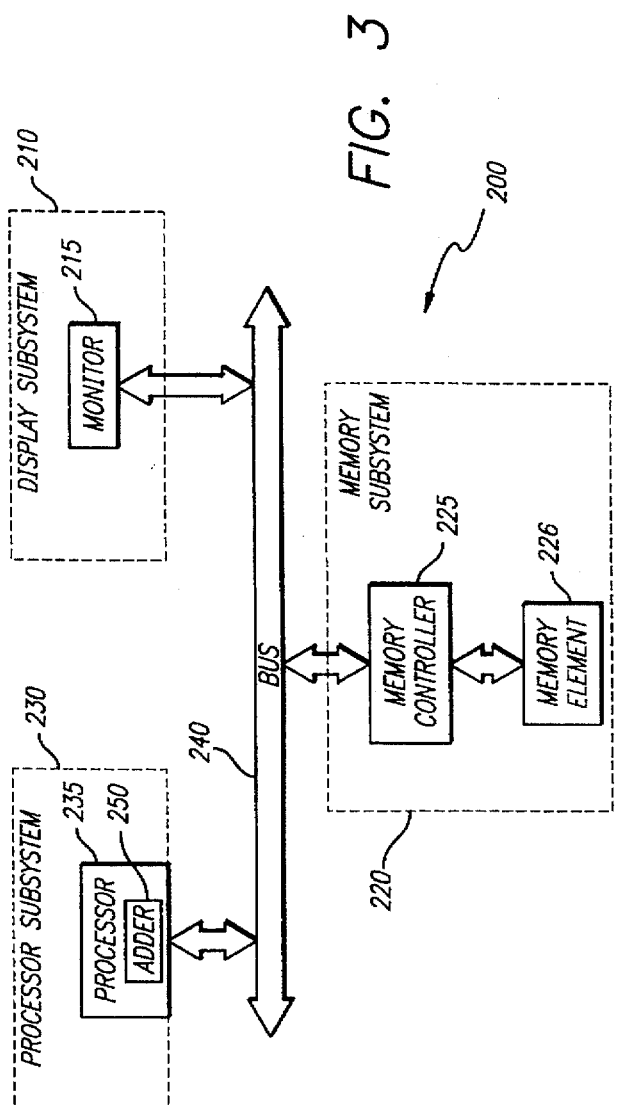
FIG. 3 is an illustrative embodiment of a computer system employing the present invention.

Referring to FIG. 3, an embodiment of a computer system 200 employing the present invention is illustrated. The computer system 200 generally comprises a display subsystem 210, a memory subsystem 220, a processor subsystem 230, all of which being coupled together by a bus 240 (e.g., an ISA bus, EISA bus, PCI bus, etc.) including address, data and control lines. The display subsystem 210 enables information to be displayed on a monitor 215 such as a cathode ray tube, flat panel display or any other monitor device. The memory subsystem 220 includes a memory controller 225 providing an interface for controlling access to at least one memory element 226 such as dynamic random access memory ("DRAM"), read only memory ("ROM"), video random access memory ("VRAM") and the like. The memory element 226 stores information and instructions for the processor subsystem 230. The processor subsystem 230 includes at least one processor 235 such as a complex instruction set computing ("CISC") processor, reduced instruction set ("RISC") processor or another type of microprocessor. An adder 250, preferably a carry-propagate adder ("CPA"), is implemented within the processor 235.

Figure 1:
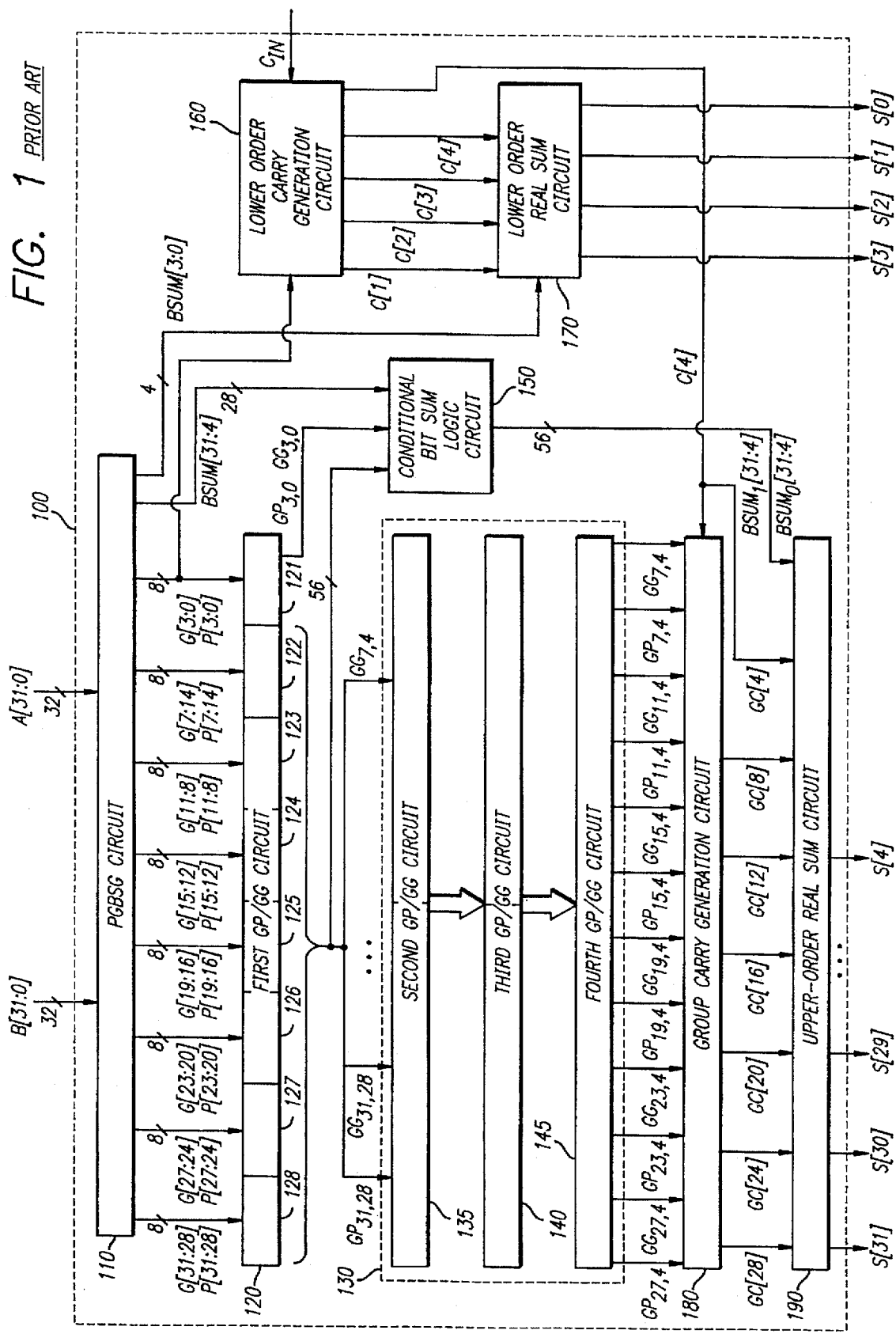
FIG. 1 illustrates a conventional carry-propagate adder ("CPA") utilizing conditional bit sums to produce a summed output.
Figure 2:
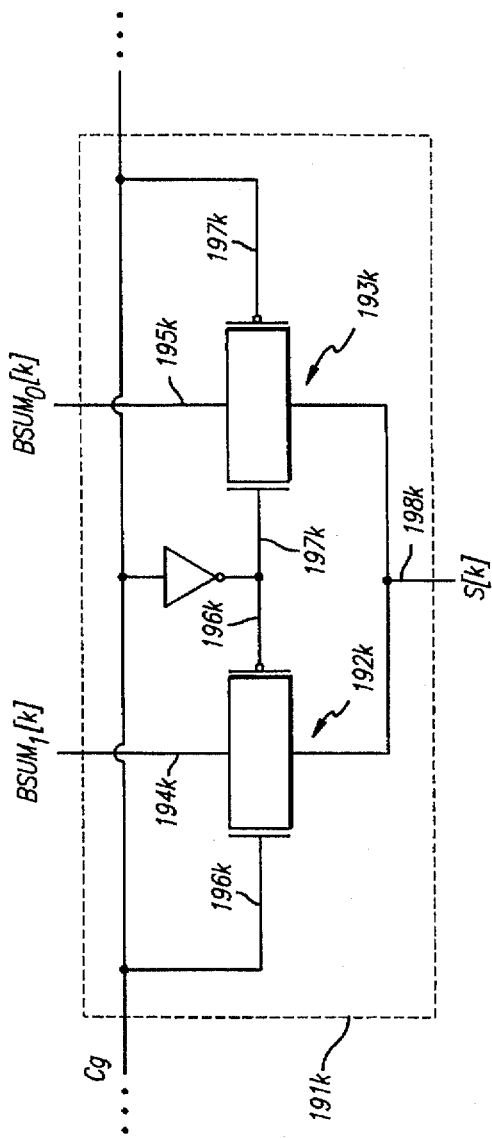
FIG. 2 is a circuit diagram of a 2:1 multiplexer of a conventional upper-order real sum circuit in the conventional CPA of FIG. 1 in which pairs of conditional bit sums are input into drains of the pass gates forming the multiplexer and a corresponding group carry is input into gates of these pass gates for selecting one output for each pair of conditional bit sums.
Figure 4:
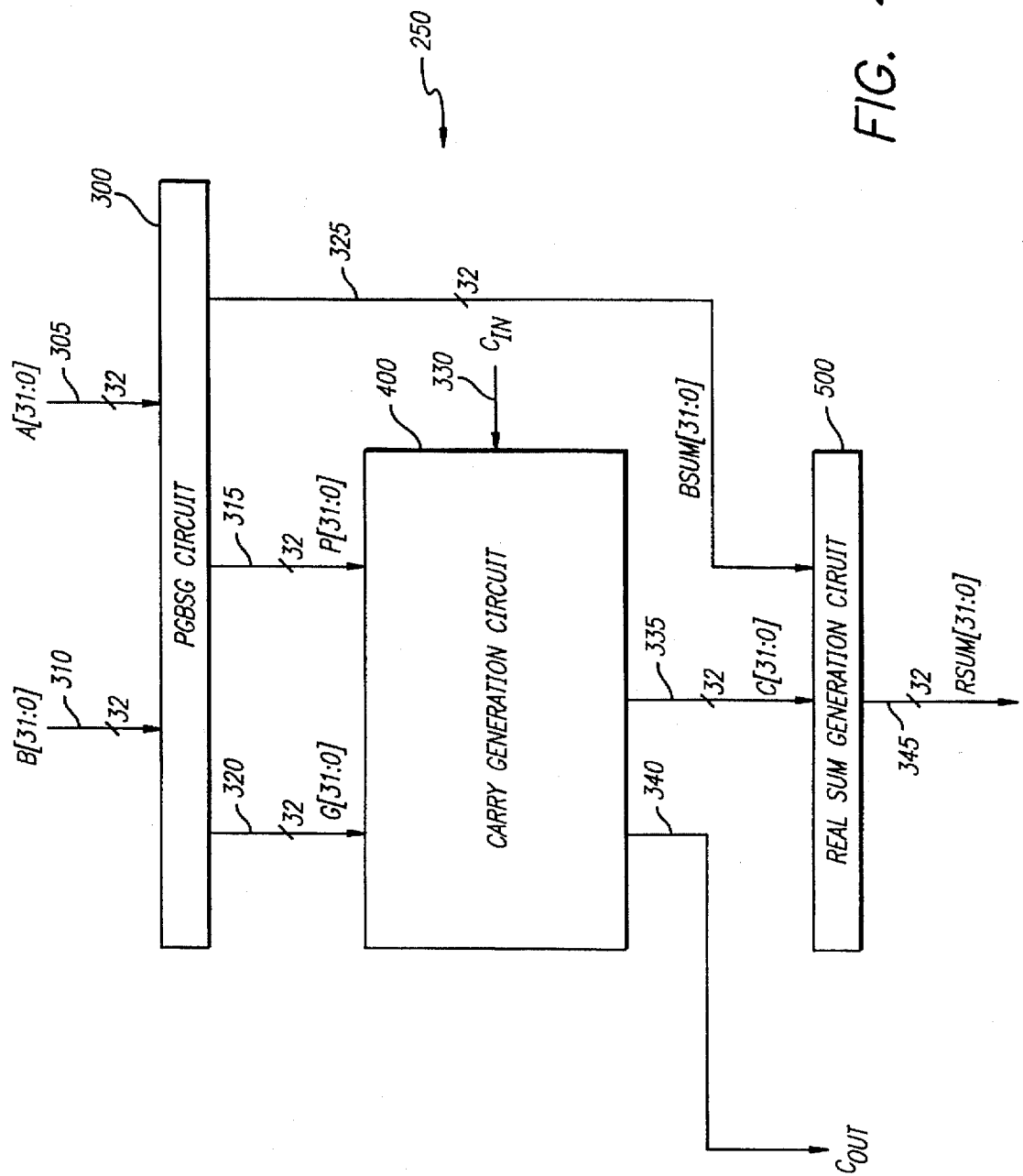
FIG. 4 is an illustrative block diagram of an embodiment of the present invention comprising a propagate/generate bit sum generation circuit, a carry generation circuit and a real sum generation circuit.

Referring now to FIG. 4, the adder 250 comprises a PGBSG circuit 300, a carry generation circuit 400 and a real sum generation circuit 500. For clarity sake, the adder 250 is represented as a 32-bit adder although it is contemplated that the adder 250 may be of any given bit length. Similar to the PGBSG circuit of the conventional CPA in FIG. 1, the PGBSG circuit 300 receives a pair of 32-bit operands $A_n$ (A[31:0]) and $B_n$ (B[31:0]) to be added via input lines 305 and 310. The PGBSG circuit 300, being combinatorial logic, performs logical OR and AND operations on identically ordered bits of the operands $A_n$ and $B_n$ to calculate appropriate propagate $P_n$ (P[31:0]), generate $G_n$ (G[31:0]) and bit sums $BSUM_n$ (BSUM[31:0]) for operands $A_n$ and $B_n$. After performing the above-identified functions, the PGBSG circuit 300 outputs each of the $P_n$ and $G_n$ signals into the carry generation circuit 400 via signal lines 315 and 320 and all of the $BSUM_n$ signals into the real sum generation circuit 500 via signal lines 325.

Receiving a global carry-in "$C_{in}$" signal through signal line 330, the carry generation circuit 400 calculates bitwise carries for each bit of the adder 250 based on these bitwise $P_n$ and $G_n$ signals in combination with a Kogge-Stone Algorithm as defined in Table B (below). The carry generation circuit 400 outputs each of the bitwise carries "$C_n$" (C[31:0]) into the real sum generation circuit 500 via signal lines 335. Optionally, the carry generation circuit 400 may calculate a carry-out signal which is outputted from the adder 250 via signal line 340.

TABLE B: Kogge-Stone Algorithm for Bitwise Carries $C[0]=C_{in}$ $C[1]=P[0]*C_{in}+G[0]$ $C[2]=P_{1,0}*C_{in}+G_{1,0}$
  (i) $G_{1,0}=P[1]*G[0]+G[1]$;
  (ii) $P_{1,0}=P[1]*P[0]$ $C[3]=P_{2,1}*C[1]+G_{2,1}$ $C[4]=P_{3,0}*C_{in}+G_{3,0}$
  (i) $G_{3,0}=P_{3,2}*G_{1,0}+G_{3,2}$;
  (ii) $P_{3,0}=P_{3,2}*P_{1,0}$ $C[5]=P_{4,1}*C[1]+G_{4,1}$ $C[6]=P_{5,2}*C[2]+G_{5,2}$ $C[7]=P_{6,3}*C[3]+G_{6,3}$ $C[8]=P_{7,0}*C_{in}+G_{7,0}$
  (i) $G_{7,0}=P_{7,4}*G_{3,0}+G_{7,4}$;
  (ii) $P_{7,0}=P_{7,4}*P_{3,0}$ $C[16]=P_{15,0}*C_{in}+G_{15,0}$
  (i) $G_{15,0}=P_{15,8}*G_{7,0}+G_{15,8}$;
  (ii) $P_{15,0}=P_{15,8}*P_{7,0}$ $C[31]=P_{30,16}*G_{15,0}+G_{30,16}$ $C[32]=P_{31,16}*G_{31,0}+G_{31,0}$ The real sum generation circuit 500 receives the bitwise carries C[31:0] as input and calculates real bit sums ("$RSUM_n$") being a bitwise exclusive OR'ing of the bitwise sums ($BSUM_n$) with corresponding $C_n$ as shown in the following algorithm:

RSUM[i]=A[i] XOR B[i] XOR C[i]=BSUM[i] XOR C[i]
(i=0 ... n)

The real bit sums are output from the adder 250 via signal lines 345.

Referring to FIGS. 5A–5B and 6A–6B, a more detailed block diagram of the carry generation circuit 400 is provided. The carry generation circuit 400 comprises a first carry generation circuit 405, a plurality of group propagate/ generate calculation ("GPGC") circuits 410a–410g, 415a–415e, 420a–420b, 425a and another plurality of carry calculation ("CC") circuits 430a–430g, all of which are coupled in a cascading fashion conducive to bit slicing. A first bit slice 400a is a buffered signal line 401 which enables a global $C_{in}$ signal to transition through the carry generation circuit to become "C[0]".

Concurrent with the operations of the first bit slice 400a, a second bit slice 400b calculates and produces a bitwise carry signal "C[1]". The second bit slice 400b includes the first carry generation circuit 405 which receives the lowest order propagate (P[0]) and generate (G[0]) signals and the global $C_{in}$ signal. Specifically, the first carry generation circuit 405 includes a dual-input AND gate 406 and a dual-input OR gate 407. More specifically, the AND gate 406 receives as input the P[0] and $C_{in}$ signals and the OR gate 407 receives as input a product signal (P[0]*$C_{in}$) from the AND gate 406 and the G[0] signal. As a result, in accordance with the Kogge-Stone algorithm, the first carry generation circuit 405 outputs a sum-product (i.e., the "C[1]" signal being equal to P[0]*$C_{in}$+G[0]) through a signal line 408. It is contemplated, however, that the AND and OR gates 406 and 407 may be combined into one complex gate for achieving greater speed.

In addition to the P[0] and G[0] signals, the next-order propagate "P[1]" and generate "G[1]" signals are input into a third bit slice 400c, namely a first GPGC circuit 410a being identical to each of the remaining plurality of GPGC circuits 410b–425a. As shown in FIG. 6A, the first group GPGC circuit 410a (where "i"=1) includes two dual-input AND gates 411 and 412 and a dual-input OR gate 413. A first AND gate 411 receives both P[0] and P[1] signals and produces a group propagate "$GP_{1,0}$" signal which is output through signal line 414a. The subscript term "1,0" is used to represent that this particular group propagate signal is the logical AND of P[0] and P[1] since $GP_{i,m}=P[i]*P[i-1]*P[i-2]*\ldots*P[m]$. A second AND gate 412 receives both G[0] and P[1] signals to produce a product signal P[1]*G[0]. This product signal is input into one of the dual-inputs of the OR gate 413 while G[1] signal is input into the other input of the OR gate 413. Thereafter, the OR gate 413 produces a group generate "$GG_{1,0}$" signal through a second output line 414b. The $GG_{1,0}$ signal is equal to G[1]+(P[1]*G[0]) since $GG_{i,m}=GG_{i,x}+(GP_{i,x}*GG_{x-1,m})$.

Both the $GP_{1,0}$ and $GG_{1,0}$ are input into a first CC circuit 430a as shown in FIG. 5 and shown in more detail in FIG. 6B. The first CC circuit 430a is identical to each of the remaining plurality of CC circuits 430b–430g. The first CC circuit 430a includes a dual-input AND gate 431 and a dual-input OR 432 gate. The AND gate 431 receives the $GP_{1,0}$ signal and logically ANDs this signal with $C_{in}$ to produce a product signal "$GP_{1,0}*C_{in}$". Thereafter, this product signal and a prior calculated $GG_{1,0}$ signal are input into the OR gate 432 to produce "C[2]" whose value is ($GP_{1,0}*C[0])+GG_{1,0}$.

Referring back to FIG. 5A, a higher-order pair of propagate and generate signals (P[2] and G[2] signals) along with P[1] and G[1] signals, are input into a second GPGC circuit 410b. Similar to the first GPGC circuit 410a, the second GPGC circuit 410b produces $GP_{2,1}$ and $GG_{2,1}$ signals. These signals, in combination with the prior calculated C[1] signal, are input into a second CC circuit 430b, producing a C[3] bit being equivalent to $GP_{2,1}*C[1]+GG_{2,1}$. However, in order to calculate the next carry bit, two stages of GPGC circuits 410c and 415a in succession are required to produce $GP_{3,0}$ and $GG_{3,0}$ signals which, in turn, are input into a third CC circuit 430c.

Figure 5A:
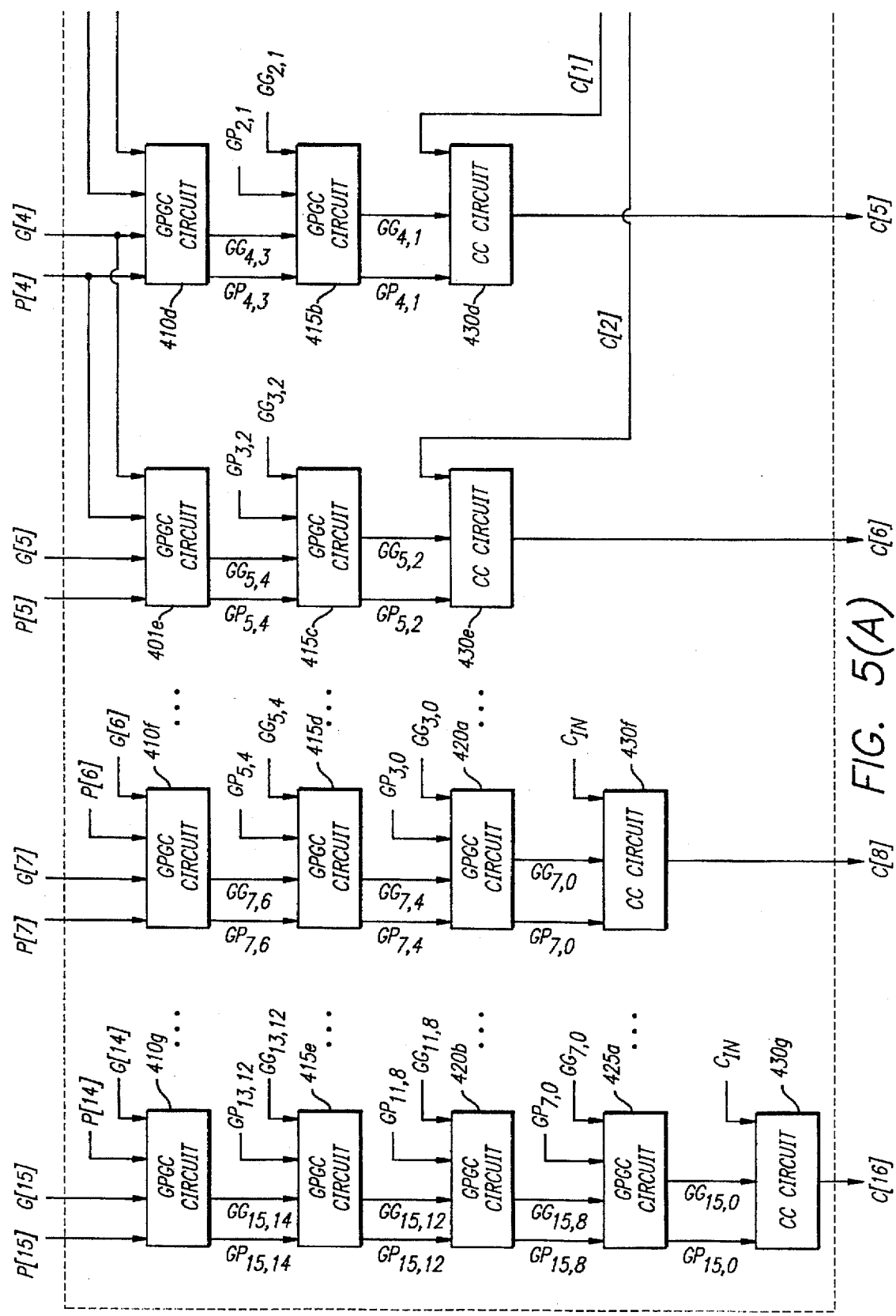
FIGS. 5A–5B are collectively an illustrative circuit diagram of an embodiment of the carry generation circuit of FIG. 4.
Figure 5B:
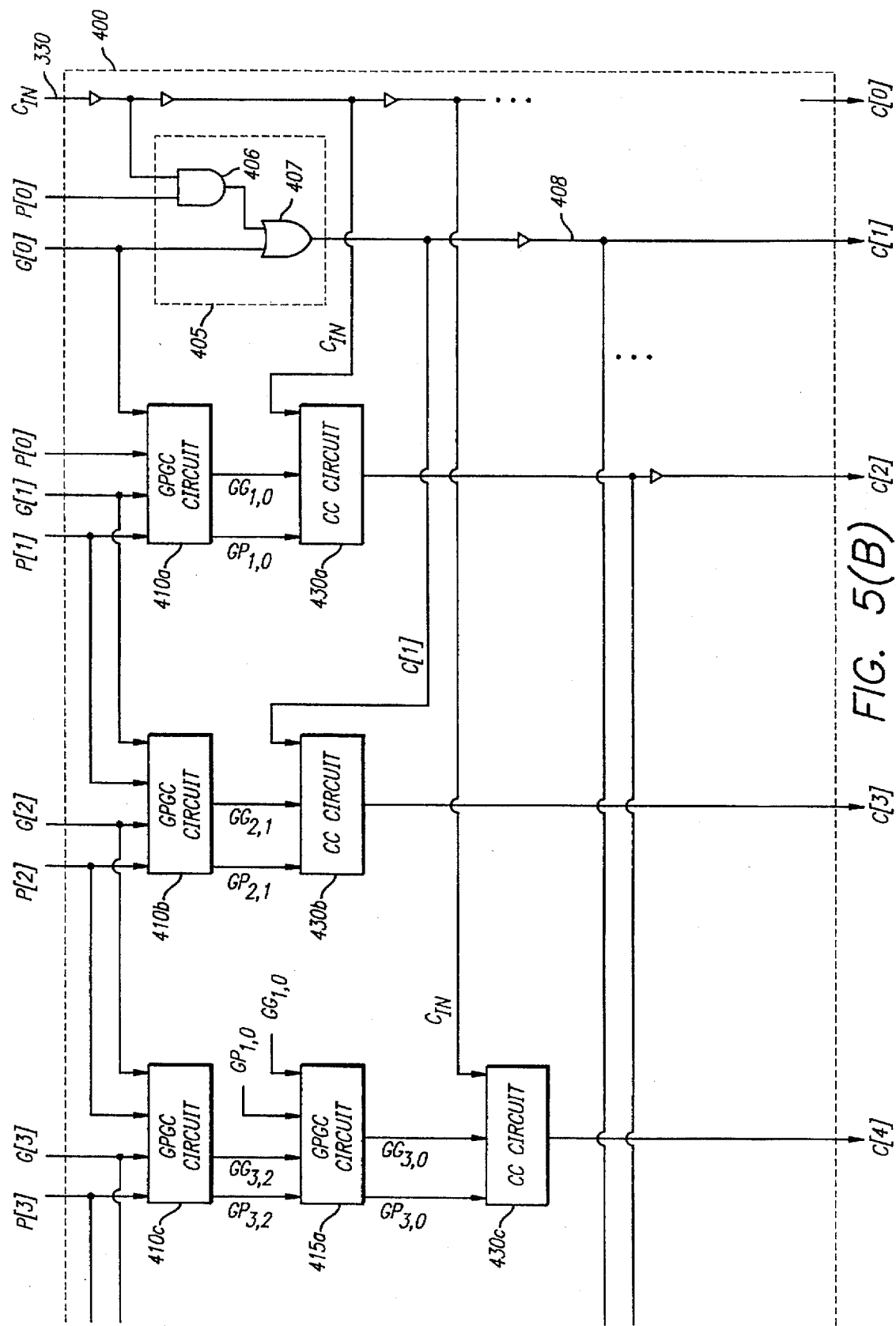

As shown in FIG. 5B and Table B (above), additional stages of GPGC circuits are needed to appropriately calculate high-order bitwise carries. For example, in order to calculate the C[6] signal, propagate and generate signals (P[5], P[4], G[5] and G[4]) are input into a GPGC circuit 410e. The GPGC circuit 410e calculates group propagate and group generate ($GP_{5,4}$ and $GG_{5,4}$) signals and transmits these signals to another GPGC circuit 415c. Besides the $GP_{5,4}$ and $GG_{5,4}$ signals, additional group propagate and group generate ($GP_{3,2}$ and $GG_{3,2}$) signals are input into the GPGC circuit 415c which calculates a combined group propagate and generate signals, namely $GP_{5,2}$ and $GG_{5,2}$ signals. Thereafter, the $GP_{5,2}$ and $GG_{5,2}$ signals along with C[2] are input into a fifth CC circuit 430e to produce C[6] being equal to $GP_{5,2}*C[2]+GG_{5,2}$. In addition, the adder 250 requires three GPGC circuits 410f, 415d and 420a and a sixth CC circuit 430f to produce bitwise C[8] (C[8]=$GP_{7,0}*C_{in}+GG_{7,0}$) and four GPGC circuits 410g, 415e, 420b and 425a along with a sixth CC circuit 430g to produce bitwise C[16] (C[16]=$GP_{15,0}*C_{in}+GG_{15,0}$).

Figure 7:
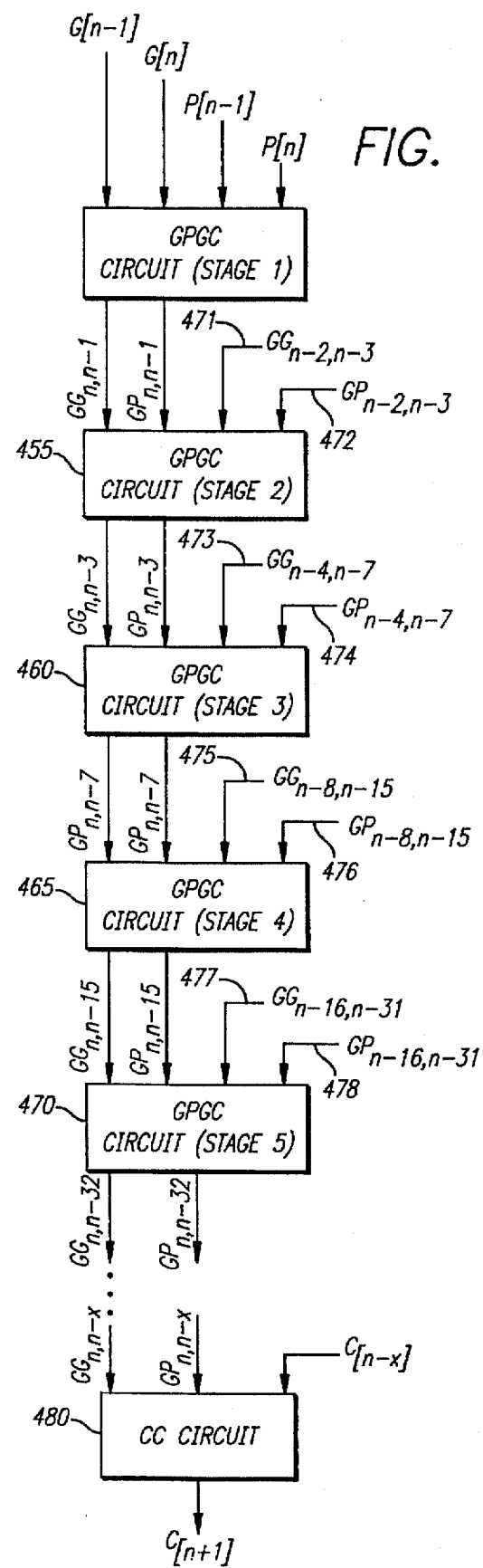
FIG. 7 is a general block diagram of a bit slice of the present invention of FIG. 5.

Referring now to FIG. 7, a general embodiment of a bit slice required for each calculation of a bitwise carry bit is shown. The number of stages "Y" to produce C[n] (last carry) may be calculated through the following algorithm:

Y=log 2 (n+1), where "Y" is rounded down to the nearest integer.

For example, for a 32-bit CPA with no carry-out (i.e., no "C[32]"), it would require log 2 (31+1) or five (5) stages of GPGC circuits 450–470 to produce C[31] being the carry-in for the 32$^{nd}$ bit of the adder. It is apparent that stages 450–470 require additional group propagate and group generate signals previously calculated in previous bit slices in order to calculate more complex group propagate and group generate signals. Namely, the second stage of GPGC circuits 455 requires as input $GP_{n-2,n-3}$ and $GG_{n-2,n-3}$ signals through input lines 471 and 472 while the third through fifth stages require as input $GP_{n-4,n-7}$ and $GG_{n-4,n-7}$; $GP_{n-8,n-15}$ and $GG_{n-8,n-15}$; and $GP_{n-16,n-31}$ and $GG_{n-16,n-31}$ through input lines 473–478, respectively. In fact, the group propagate and group generate signals are configured to double for each stage up to log2 (n+1) stages where "n" is the bit length of the CPA. Thus, the present invention uses one less gate delay in the critical path to generate the carries than the conventional CPA of FIG. 1.

The final group propagate and group generate signals, namely $GP_{n,n-x}$ and $GG_{n,n-x}$ signals, are input into a corresponding CC circuit 480. The carry C[n-x] associated with $GP_{n,n-x}$ and $GG_{n,n-x}$ signals, also is input into the carry CC circuit 480 which calculates the particular carry bit associated with the bit slice. The value "x" may be calculated by the following algorithm:

x=$2^Y$–1, where Y=log 2 (n+1) rounded down to nearest integer.

Referring back to FIG. 4, the bitwise carries "$C_n$" along with the bit sums ($BSUM_n$) are input into the real sum generation circuit 500 which includes a plurality of dual-input multiplexers (not shown) corresponding in number to the bit length of the adder 250. For this embodiment, the real sum generation circuit 500 includes thirty-two (32) multiplexers solely coupled to their corresponding BSUM[31:0] and C[31:0] signals as shown in FIG. 8.

Each multiplexer, for example the i$^{th}$ multiplexer 510 of the real sum generation circuit 500, includes a first and second pass gates 515 and 520. The carry C[i] signal and its complement "$\overline{C[i]}$" are coupled to both drain 516 and 521 of the first and second pass gates 515 and 520. An appropriate BSUM[i] signal, associated with the C[i] signal, is coupled to gates 517, 518 and 522, 523 of both pass gates 515 and 520. Thus, the BSUM[i] signal selectively outputs C[i] or alternatively $\overline{C[i]}$ through signal line 525 as a real sum bit RSUM[i] because RSUM[i]=A[i] XOR B[i] XOR C[i]. As a result, since the BSUM[i] signal arrives before the C[i] or $\overline{C[i]}$ signal, the time delay is reduced by 66%, compared to the delay of the conventional CPA of FIG. 1.

Figure 9:
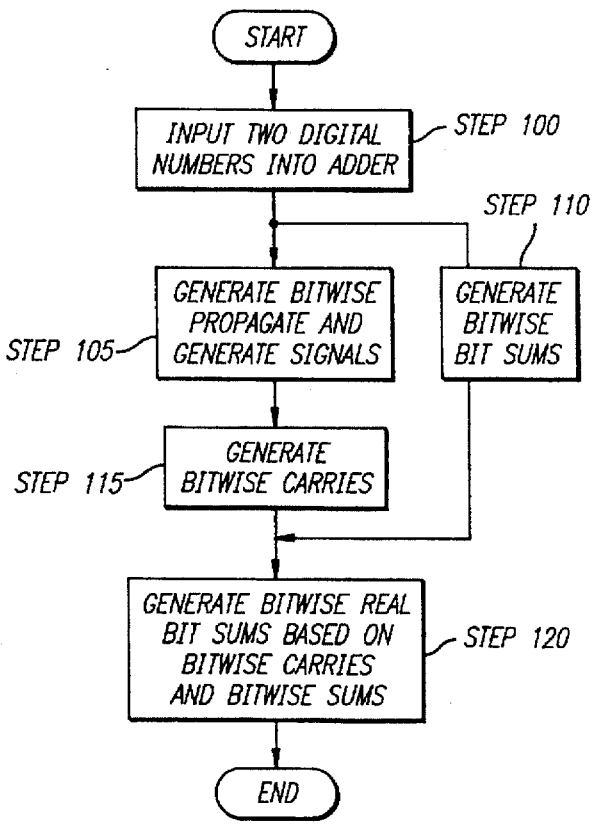
FIG. 9 is a flowchart illustrating the procedural steps in performing operations required by the CPA.

It is contemplated that various techniques may be used to calculate the real bit sums and still avoid hardware implementation of the adder; however, any of these techniques require performance of five operational steps as shown in FIG. 9. The first step is to input two digital numbers into the adder (Step 100). Next, in step 105, bitwise propagate and generate signals are generated from these digital numbers. Generally concurrent with the operations of Step 105, bitwise sums are generated (Step 110). In Step 115, the bitwise propagate and generate signals are used to produce bitwise carries. Finally, the bitwise carries and the bitwise sums are used to produce bitwise real sums. Collectively, the bitwise real sums are equivalent to the logical sum of the two digital numbers.

The present invention described herein may be designed in many different embodiments evident to one skilled in the art than those described without departing from the spirit and scope of the present invention. For example, although non-inverting standard TTL logic gates have been set forth, it is contemplated that inverting standard TTL logic gates may be employed. Moreover, CMOS and/or BiCMOS technology may be used in the PGBSG circuit, carry generation circuit and a real sum generation circuit rather than standard TTL logic. Moreover, static and/or dynamic CMOS logic may be used in the PGBSG circuit, carry generation circuit and real sum generation circuit even though a "fully static"

implementation has been used to describe this invention. The invention should, therefore be measured in terms of the claims which follow.

What is claimed is:

1. An integrated circuit device performing arithmetic operations on a first digital input and a second digital input, the integrated circuit device comprising:

a first circuit capable of performing logical operations on the first and second digital inputs to produce a plurality of bitwise propagate signals, a corresponding plurality of bitwise generate signals and a plurality of bit sums associated with the first and second digital inputs:

a second circuit coupled to said first circuit, said second circuit capable of performing logical operations on said plurality of bitwise propagate signals, said plurality of bitwise generate signals and a global carry signal to produce a plurality of bitwise carry signals; and a third circuit coupled to said first and second circuits, said third circuit capable of performing logical operations on said plurality of bit sums and said plurality of bitwise carry signals generated by said second circuit in order to produce a plurality of real bit sums.

2. The integrated circuit device according to claim 1, wherein said first circuit includes at least one exclusive OR logic gate for logically XOR'ing identically ordered bits of the first and second digital inputs to produce said plurality of bit sums.

3. The integrated circuit device according to claim 1, wherein said second circuit includes a plurality of bit slices in which each bit slice includes:

at least one group propagate/generate calculation circuit which calculates a group propagate signal and a group generate signal based on a plurality of propagate and generate signals input into said bit slice; and a carry calculation circuit coupled to said at least one group propagate/generate calculation circuit, said carry calculation circuit capable of performing logical operations on said group propagate and said group generate signals.

4. The integrated circuit device according to claim 3, wherein said at least one group propagate/generate calculation circuit includes a logic gate which receives as input said plurality of propagate signals to produce said group propagate signal.

5. The integrated circuit device according to claim 4, wherein said at least one group propagate/generate calculation circuit further includes a plurality of logic gates which receives as input a most significant propagate signal of said plurality of propagate signals and said plurality of generate signals and produces said group generate signal.

6. The integrated circuit device according to claim 5, wherein said plurality of logic gates includes:

a first logic gate producing a product signal of a most significant propagate signal of said plurality of propagate signals and a least significant generate signal of said plurality of generate signals; and a second logic gate, serially coupled to said first logic gate to receive as input said product signal and a most significant generate signal, producing said group propagate signal.

7. The integrated circuit device according to claim 1, wherein said third circuit includes a plurality of multiplexers corresponding in number to said plurality of bitwise carry signals in which each of said plurality of multiplexers receives as input a predetermined one of said plurality of bitwise carry signals and a complement of said predetermined one of said plurality of bitwise carry signals.

8. The integrated circuit device according to claim 7, wherein each of said plurality of multiplexers is selected by a predetermined one of said plurality of bit sums.

9. An integrated circuit device performing arithmetic operations on a first digital input and a second digital input, the integrated circuit device comprising:

first means for performing logical operations on the first and second digital inputs to produce a plurality of bitwise propagate signals and a corresponding plurality of bitwise generate signals and for performing logical operations on said first and second digital inputs to generate a plurality of bit sums;

second means for performing logical operations on said plurality of bitwise propagate signals, said plurality of bitwise generate signals and a global carry signal to produce a plurality of bitwise carry signals, said second means being coupled to said first means; and third means for performing logical operations on said plurality of bit sums and said plurality of bitwise carry signals generated by said second means in order to produce a plurality of real bit sums, said third means being coupled to said first and second means.

10. The integrated circuit device according to claim 9, wherein said second means includes a plurality of bit slices in which each bit slice includes:

grouping means for calculating a group propagate signal and a group generate signal based on a plurality of propagate and generate signals input into said bit slice; and carry calculation means for performing logical operations on said group propagate and said group generate signals, said carry calculation means being coupled to said grouping means.

11. The integrated circuit device according to claim 10, wherein said grouping means includes at least one logic gate which receives as input said plurality of propagate signals, said at least one logic gate produces said group propagate signal.

12. The integrated circuit device according to claim 11, wherein said grouping means further includes a plurality of logic gates which receive as input a most significant propagate signal of said plurality of propagate signals and said plurality of generate signals and produce said group generate signal.

13. The integrated circuit device according to claim 12, wherein said plurality of logic gates includes:

a first logic gate producing a product signal of a most significant propagate signal of said plurality of propagate signals logically AND'ed with a least significant generate signal of said plurality of generate signals; and a second logic gate, serially coupled to said first logic gate to receive as input said product signal and a most significant generate signal, producing said group propagate signal.

14. The integrated circuit device according to claim 9, wherein said third means includes a plurality of multiplexers corresponding in number to said plurality of bitwise carry signals produced by said second means in which each of said plurality of multiplexers receives as input a predetermined one of said plurality of bitwise carry signals and a complement of said predetermined one of said plurality of bitwise carry signals.

15. The integrated circuit device according to claim 9, wherein each of said plurality of multiplexers is selected by a predetermined one of said plurality of bit sums.

16. The computer system comprising:

memory means storing a first digital input and a second digital input, said first and second inputs being digital information;

means for processing said first and second digital inputs, said processing means including an integrated circuit device performing arithmetic operations on said first input and said second input, said integrated circuit device comprising:

first means for performing logical operations on the first and second digital inputs to produce a plurality of bitwise propagate signals and a corresponding plurality of bitwise generate signals and for performing logical operations on said first and a digital inputs to generate said plurality of bit sums, second means for performing logical operations on said plurality of bitwise propagate signals, said plurality of bitwise generate signals and a global carry signal to produce a plurality of bitwise carry signals, said second means being coupled to said first means, and third means for performing logical operations on said plurality of bit sums and said plurality of bitwise carry signals generated by said second means in order to produce a plurality of real bit sums, said third means being coupled to said first and second means; and bus means for enabling communication between said storing means and said processing means, said means being coupled to said storing means and said processing means.

17. The computer system according to claim 16, wherein said second means includes a plurality of bit slices in which each bit slice includes:

grouping means for calculating a group propagate signal and a group generate signal based on a plurality of propagate and generate signals input into said bit slice; and carry calculation means for performing logical operations on said group propagate and said group generate signals, said carry calculation means being coupled to said grouping means.

18. The computer system according to claim 17, wherein said grouping means includes at least one logic gate which receives as input said plurality of propagate signals, said at least one logic gate produces said group propagate signal.

19. The computer system according to claim 18, wherein said grouping means further includes a plurality of logic gates which (i) receive as input a most significant propagate signal of said plurality of propagate signals and said plurality of generate signals and (ii) produce said group generate signal.

20. The computer system according to claim 16, wherein said third means of said means for processing includes a plurality of multiplexers corresponding in number to said plurality of bitwise carry signals produced by said second means in which each of said plurality of multiplexers receives as input a predetermined one of said plurality of bitwise carry signals and a complement of said predetermined one of said plurality of bitwise carry signals.

21. The computer system according to claim 20, wherein each of said plurality of multiplexers is selected by a predetermined one of said plurality of bit sums.

22. The computer system comprising:

a memory subsystem including a memory element storing a first digital input and second digital input, said first and second digital inputs being a series of information bits;

a processing subsystem including a processor which performs logical operations on said first and second digital inputs, said processor including an integrated circuit device for performing arithmetic operations on said first and second digital inputs, said integrated circuit device comprising:

a first circuit capable of performing logical operations on the first and second digital inputs to produce a plurality of bitwise propagate signals, a corresponding plurality of bitwise generate signals, and a plurality of bit sums, a second circuit coupled to said first circuit, said second circuit capable of performing logical operations on said plurality of bitwise propagate signals, said plurality of bitwise generate signals and a global carry signal to produce a plurality of bitwise carry signals, and a third circuit coupled to said first and second circuits, said third circuit capable of performing logical operations on said plurality of bit sums and said plurality of bitwise carry signals generated by said second circuit in order to produce a plurality of real bit sums; and a bus coupled to said memory subsystem and said processing subsystem, said bus capable of enabling communication between said memory element of said memory subsystem and said processor of said processing means.

23. The computer system according to claim 22, wherein said first circuit includes at least one exclusive OR logic gate for logically XOR'ing identically ordered bits of the first and second digital inputs to produce said plurality of bit sums.

24. The computer system according to claim 22, wherein said second circuit includes a plurality of bit slices in which each bit slice includes:

at least one group propagate/generate calculation circuit which calculates a group propagate signal and a group generate signal based on a plurality of propagate and generate signals input into said bit slice, and a carry calculation circuit, coupled to said at least one group propagate/generate calculation circuit, performing logical operations on said group propagate and said group generate signals.

25. The computer system according to claim 24, wherein said at least one group propagate/generate calculation circuit includes a logic gate which receives as input said plurality of propagate signals to produce said group propagate signal.

26. The computer system according to claim 25, wherein said at least one group propagate/generate calculation circuit includes a plurality of logic gates which receives as input a most significant propagate signal of said plurality of propagate signals and said plurality of generate signals and produces said group generate signal.

27. The computer system according to claim 26, wherein said plurality of logic gates includes a first logic gate producing a product signal of a most significant propagate signal of said plurality of propagate signals and a least significant generate signal of said plurality of generate signals; and a second logic gate, serially coupled to said first logic gate to receive as input said product signal and a most significant generate signal, producing said group propagate signal.

28. The integrated circuit device according to claim 22, wherein said third circuit includes a plurality of multiplexers corresponding in number to said plurality of bitwise carry signals in which each of said plurality of multiplexers receives as input a predetermined one of said plurality of bitwise carry signals and a complement of said predetermined one of said plurality of bitwise carry signals.

29. The integrated circuit device according to claim 28, wherein each of said plurality of multiplexers is selected by a predetermined one of said plurality of bit sums.

* * * * *

UNITED STATES PATENT AND TRADEMARK OFFICE
CERTIFICATE OF CORRECTION

PATENT NO.    :  5,701,504
DATED         :  December 23, 1997
INVENTOR(S)   :  Mark A. Timko It is certified that error appears in the above-identified patent and that said Letters Patent is hereby corrected as shown below:

In column 11 at lines 8-9 delete "and a digital inputs to generate said plurality" and insert --and second inputs to generate a plurality--

Signed and Sealed this

Twenty-fifth Day of August, 1998

Attest:

BRUCE LEHMAN

*Attesting Officer*    Commissioner of Patents and Trademarks